(12) United States Patent
Kim et al.

(10) Patent No.: US 9,357,555 B2
(45) Date of Patent: May 31, 2016

(54) APPARATUS AND METHOD FOR CONTROLLING MEMORY CLOCK FREQUENCY IN WIRELESS COMMUNICATION SYSTEM

(71) Applicant: Samsung Electronics Co., Ltd., Gyeonggi-do (KR)

(72) Inventors: Ki-Yong Kim, Gyeonggi-do (KR); Young-Seok Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 354 days.

(21) Appl. No.: 13/777,224

(22) Filed: Feb. 26, 2013

(65) Prior Publication Data

US 2013/0229994 A1    Sep. 5, 2013

(30) Foreign Application Priority Data

Mar. 2, 2012   (KR) ........................ 10-2012-0021873

(51) Int. Cl.
*H04W 4/00*    (2009.01)
*H04W 72/08*    (2009.01)
*G06F 1/08*    (2006.01)

(52) U.S. Cl.
CPC ............... *H04W 72/082* (2013.01); *G06F 1/08* (2013.01)

(58) Field of Classification Search
None
See application file for complete search history.

(56) References Cited

U.S. PATENT DOCUMENTS

| | | | |
|---|---|---|---|
| 8,312,310 B2 * | 11/2012 | Tabeta | .......................... 713/500 |
| 2007/0009067 A1 | 1/2007 | Michalak | |
| 2009/0080583 A1 | 3/2009 | Skinner et al. | |
| 2011/0051700 A1 | 3/2011 | Geiger et al. | |

FOREIGN PATENT DOCUMENTS

| | | |
|---|---|---|
| CN | 101273558 A | 9/2008 |
| CN | 101809901 A | 8/2010 |

* cited by examiner

*Primary Examiner* — Afshawn Towfighi
(74) *Attorney, Agent, or Firm* — Cha & Reiter, LLC.

(57) ABSTRACT

The present invention prevents performance degradation caused by a multiplication frequency of a memory clock in a wireless communication system by changing a frequency of the memory clock so that a multiplication frequency is not sufficiently close to a transmission/reception frequency that will cause noise or interference with a data transmission/reception. A communication apparatus according to the present invention includes a controller comprising at least one processor; and a memory for operating at a clock provided from the controller. The controller checks a communication frequency, determines whether the communication frequency is a value in a range of interference from a multiplication frequency of a memory clock frequency, and changes the memory clock frequency.

21 Claims, 3 Drawing Sheets

APPARATUS AND METHOD FOR CONTROLLING MEMORY CLOCK FREQUENCY IN WIRELESS COMMUNICATION SYSTEM

CLAIM OF PRIORITY

The present application claims the benefit of priority under 35 U.S.C. §119(a) from a Korean patent application filed in the Korean Intellectual Property Office on Mar. 2, 2012, and assigned Serial No. 10-2012-0021873, the entire disclosure of which is hereby incorporated by reference in its entirety.

BACKGROUND OF THE INVENTION

1. Field of the Invention

The present invention relates generally to a wireless communication system.

2. Description of the Related Art

A communication device of a wireless communication system typically includes other components for operating as an electronic device, in addition to components for transmitting and receiving signals. For example, the communication device requires a memory, a power interface, and so on. The components of the transmitting and receiving device typically include a plurality of circuits, and the circuits are connected with a conductive line such as printed circuit.

According to an exemplary configuration and connection structure of the circuit of a communication device, problems often arise in that an unintended noise signal can occur. For example, frequency multiplying of the clock causes a significant amount of noise. In particular, as the multiplication frequency of a memory clock used to operate the memory approaches a frequency of a communication channel, Radio Frequency (RF) transmission and reception performance can be degraded.

Conventionally, the noise in the circuit such as a communication device is generally addressed using a shielding technique. The shielding electronically shields the line in order to block the signal from passing through an unintended path. However, to block the noise leakage using the shielding technique, thorough structural blocking is required. However, it is difficult to apply shielding processing with a necessary degree of precision to be effective because of limitations on the circuit size and the arrangement of components. Further, when the circuit is changed, the shielding structure should be altered.

SUMMARY OF THE INVENTION

To address in part at least some of the above-discussed deficiencies of conventional noise reduction, the present invention provides an apparatus and a method for preventing performance degradation caused by noise generating in a circuit of a wireless communication system.

The present invention also provides an apparatus and a method for preventing performance degradation caused by frequency multiplication of a memory clock in a wireless communication system.

The present invention provides an apparatus and a method for preventing performance degradation caused by frequency multiplication of a memory clock in a wireless communication system.

According to an exemplary aspect of the present invention, a communication apparatus in a wireless communication system may include a controller comprising at least one processor; and a memory for operating at a clock provided from the controller. The controller is configured to check a communication frequency, determine whether the communication frequency is a value in a range of interference from a multiplication frequency of a memory clock frequency, and change the memory clock frequency.

According to another exemplary aspect of the present invention, a method of operating a communication apparatus in a wireless communication system may include checking a communication frequency; determining whether the communication frequency is a value in a range of interference from a multiplication frequency of a memory clock frequency; and changing the memory clock frequency.

According to yet another exemplary aspect of the present invention, a communication apparatus in a wireless communication system may include at least one processor; a memory for operating at a clock provided from the at least one processor; and at least one module stored in the memory to be executed by the at least one processor. The module includes machine executable code on a machine readable medium including an instruction for checking a communication frequency, an instruction for determining whether the communication frequency is a value in a range of interference from a multiplication frequency of a memory clock frequency, and an instruction for changing the memory clock frequency.

Other exemplary aspects, advantages, and salient features of the invention will be enabled to those skilled in the art from the following detailed description, which, taken in conjunction with the annexed drawings, discloses exemplary embodiments of the invention.

BRIEF DESCRIPTION OF THE DRAWINGS

The above and other exemplary aspects, features, and advantages of certain exemplary embodiments of the present invention discussed herein below will be explained in more detail based on the following description taken in conjunction with the accompanying drawings, in which.

Throughout the drawings, like reference numerals will be understood to refer to like parts, components and structures.

DETAILED DESCRIPTION

Figure 1:
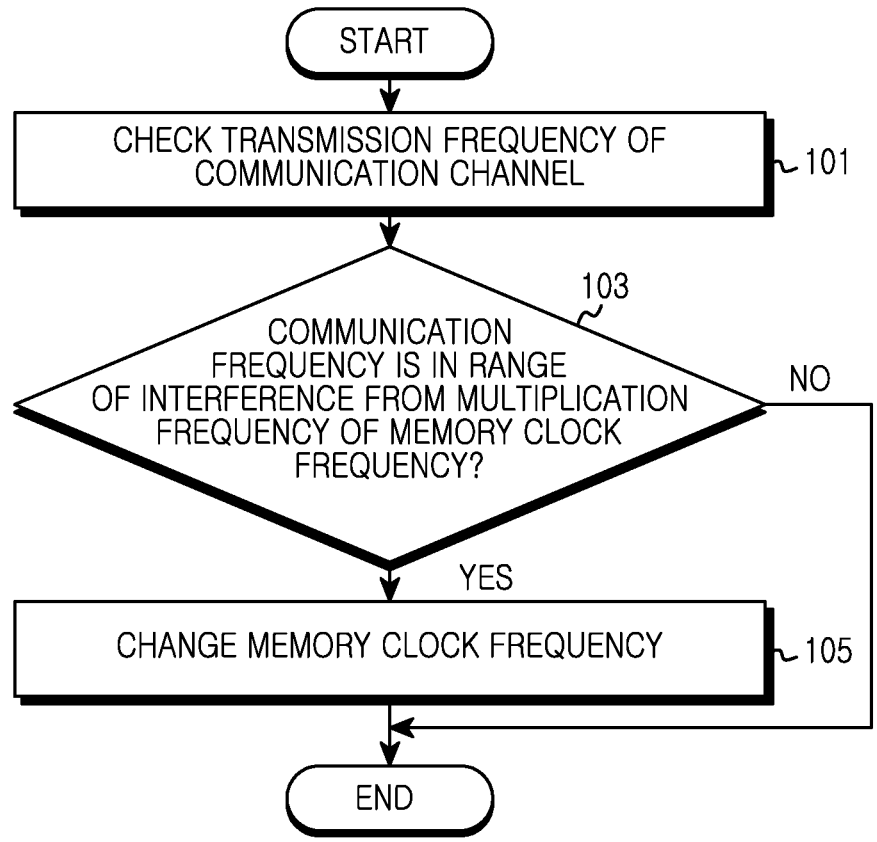
FIG. 1 is a flowchart providing an overview of exemplary operations of a communication apparatus in a wireless communication system according to an exemplary embodiment of the present invention.

The following description with reference to the accompanying drawings is provided to assist a person of ordinary skill in the art with a comprehensive understanding of exemplary embodiments of the invention as defined by the claims and their equivalents. The description includes various specific details to assist in that understanding but such description is merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness so as not to obscure appreciation of the invention by the person of ordinary skill in the art with discussion of such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustrative purposes only and not for the purpose of limiting the invention as defined by the appended claims and their equivalents.

It is to be understood that the singular forms "a," "an," and "the" may include plural references unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to performance degradation in a wireless communication system because of noise. Exemplary embodiments of the present invention provide a technique for preventing performance degradation caused by multiplication frequency of a memory clock of a communication apparatus in a wireless communication system. Herein, the communication apparatus represents an exemplary device for transmitting and receiving signals over via wireless frequencies, such as a radio channel, and may encompasses a user terminal, a portable device, a base station, and the like.

When predicting sensitivity degradation caused by multiplication frequency of a memory clock in a particular communication channel, the communication apparatus changes the clock frequency of the memory.

For example, in a Global System for Mobile communication (GSM) system, Channels (Chs) 975 through 1000 are GSM low channels that utilize frequencies ranging from 925.2 through 930.2 MHz. In so doing, when the clock frequency of the memory is 10 MHz, spurious occurrence generates based on 930 MHz which is the 93rd-time multiplying frequency. In this case, the spurious occurrence, that is, interference generates in a certain band based on 930 MHz. A bandwidth of the interference varies according to characteristics of the communication apparatus, in particular, according to characteristics of the memory. At this time, when the clock frequency of the memory is changed to 9 MHz, a spurious region is changed to around 837 MHz, in order to lessen the interference onto the communication frequency.

To determine whether the memory clock frequency has changed or should change, the communication apparatus according to an exemplary embodiment of the present invention can directly calculate the multiplication frequency of the memory clock frequency and then compare same with the communication frequency. It is advantageous that the bandwidth of the interference is considered when comparing the multiplying frequency and the communication frequency. Alternatively, the communication apparatus can determine whether the memory clock frequency is changed by using a predefined table. When determining the memory clock frequency should change, the communication apparatus can directly calculate the changed frequency or use the predefined table.

In other words, the communication apparatus according to an exemplary embodiment of the present invention improves the RF sensitivity degradation without changing the hardware by improving the sensitivity degradation of the multiplication frequency of the memory clock in a particular communication channel. More specifically, since the multiplication frequency is changed by altering the clock frequency of the memory, the circuit substrate size and the component arrangement are not limited.

FIG. 1 is a flowchart of operations of a communication apparatus in a wireless communication system according to an exemplary embodiment of the present invention.

Referring now to FIG. 1, at step 101 the communication apparatus checks the frequency of the communication channel. That is, the communication apparatus checks the transmission frequency of the received signal. The transmission frequency of the communication channel that receives the signal, that is, the communication frequency, can correspond to a particular operation mode of the communication apparatus. In this case, step 101 can be replaced with an operation for checking the operation mode. The communication frequency can correspond to the frequency of the communication channel. In this case, step 101 can be replaced with an operation for checking the communication channel. That is, the communication apparatus can directly check the communication frequency, or indirectly check the communication frequency based on relevant information such as an operation mode or communication channel.

At step 103, the communication apparatus determines whether the communication frequency is a value in the range of the interference from the multiplication frequency of the memory clock frequency. Namely, the communication apparatus determines whether the communication frequency is equal to an integral multiple of the memory clock frequency, or close to a certain predefined range. For example, the range may be defined as a half of a communication bandwidth. For another example, the range may be defined as a sum of a half of a communication bandwidth and a guard value. Specifically, when the communication frequency is 1990 MHz and the communication bandwidth is 15 MHz, the integral multiple of the memory clock frequency being in between 1989.25 MHz to 1990.75 MHz generates the interference.

According to an exemplary embodiment of the present invention, the communication apparatus can calculate the multiplication frequency value of the memory clock frequency and determine whether or not the communication frequency is similar to the multiplication frequency of the memory clock frequency. Moreover, the communication apparatus determines whether or not a difference between the communication frequency and the multiplication frequency is below a threshold. Herein, the threshold is predefined in consideration of the bandwidth affected by the interference of the multiplication frequency of the memory, and the bandwidth affected by the interference varies according to the characteristics of the communication apparatus. Alternatively, the communication apparatus can pre-store a table or file which defines the interference relationship between the communication frequency and the memory clock frequency. In this case, when the current communication frequency is the value of the range corresponding to the current memory clock frequency in the table, the communication apparatus can determine that the communication frequency is in the range of the interference. Alternatively, the communication apparatus can pre-store a table which defines not having interference or recommendation for use between the communication frequency and the memory clock frequency. In other words, the pre-storing of a table which defines 'non-interference relationship between the communication frequency and the memory clock frequency'. In this case, when the current communication frequency is not the value of the range corresponding to the current memory clock frequency found in the table, the communication apparatus can determine that the communication frequency is in the range of the interference.

When the communication frequency is the value in the range of the interference from the multiplication frequency of the memory clock frequency, then at step 105 the communication apparatus changes the memory clock frequency. According to an exemplary embodiment of the present invention, the communication apparatus can determine whether the memory clock frequency value should change based on a function in which the communication frequency value and the memory clock frequency value as its input variables. In other words, the communication apparatus can calculate the memory clock frequency value to change using the communication frequency value and the memory clock frequency value. Alternatively, the communication apparatus can pre-store a table which defines the memory clock frequency values recommended for the available communication frequencies. In this case, the communication apparatus can change the memory clock frequency with the memory clock frequency value corresponding to the current communication frequency in the table.

Figure 2:
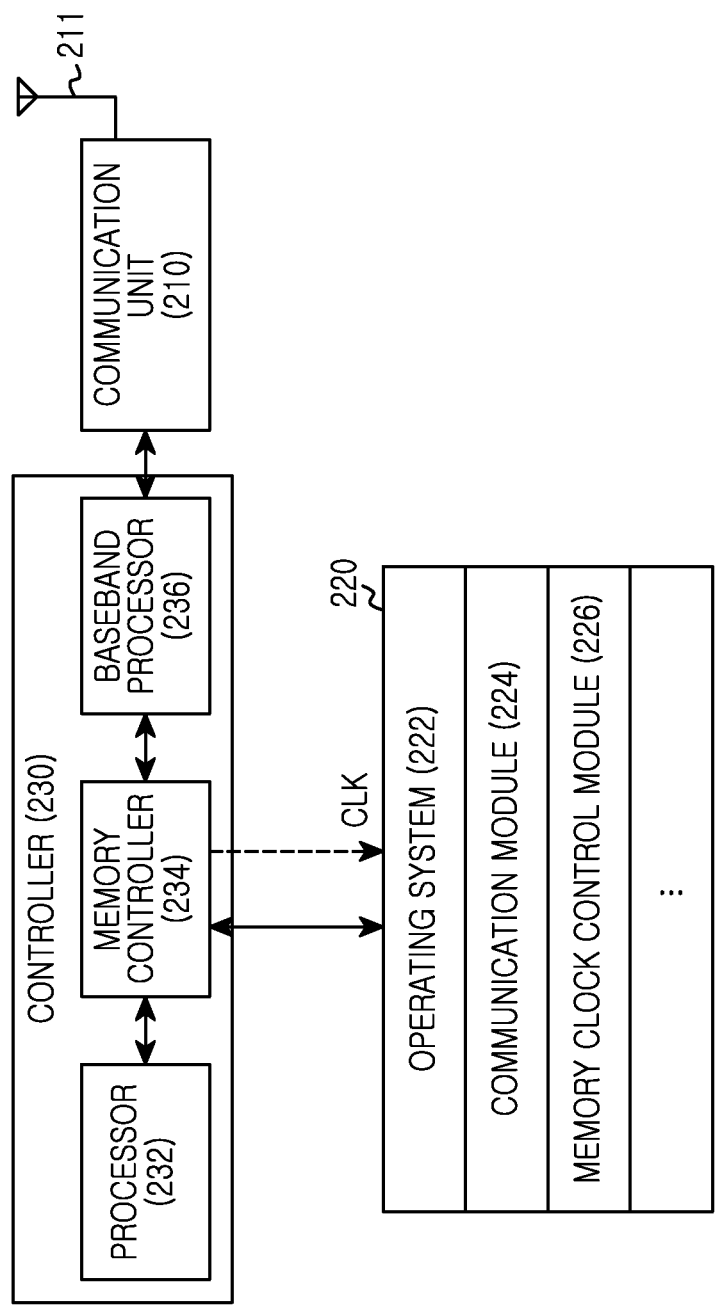
FIG. 2 is a block diagram of the communication apparatus in the wireless communication system according to an exemplary embodiment of the present invention.

FIG. 2 is a block diagram of the communication apparatus in the wireless communication system according to an exemplary embodiment of the present invention. In FIG. 2, the function for changing the memory clock frequency of the present invention is realized using a software module comprising machine executable code that is loaded into hardware such as a processor or microprocessor of a controller to configure the controller to operate, for example, as in the algorithm shown in FIG. 1. An artisan understands and appreciates that the modules may include their own sub-processor or may use the processor of the controller to be loaded with the machine executable code.

As shown in the example of FIG. 2, the communication apparatus includes a wireless communication unit 210, an antenna 211, a memory 220, and a controller 230.

The communication unit 210 comprises a transceiver in order to transmit and receive signals wirelessly, such as over a radio channel. For example, the communication unit 210 preferably includes an RF circuit. More particularly, the communication unit 210 includes additional hardware such as an up converter that up-converts a baseband signal to an RF signal, the transceiver which transmits the RF signal via an antenna 211, and a down converter that down-converts an RF signal received via the antenna to a baseband signal. In still more detail, the communication unit 210 can include an amplifier, a mixer, an oscillator, a Digital to Analog Converter (DAC), an Analog to Digital Converter (ADC), and so on.

The memory 220, which is a non-transitory machine readable medium, stores a program for operating the communication apparatus, and machine executable code. The memory 220 receives a memory clock signal from the controller 230. For example, the memory 220 can store software and/or firmware, and the software can include an operating system 222 and a communication module 224. Particularly, according to an exemplary embodiment of the present invention, the software comprises a memory clock control module 226. Herein, the memory clock control module can be referred to as an instruction set, which is loaded into hardware such as a processor or microprocessor for operation. The memory 220 can store at least one of the table arranging the interference relationship between the communication frequency and the memory clock frequency, and the table arranging "a non-interference relationship" between the communication frequency and the memory clock frequency, and the table arranging the memory clock frequency values recommended for the available communication frequencies.

The memory clock control module 226, which comprises the machine executable code for operating as shown in the algorithm of FIG. 1, includes at least one instruction. In detail, the memory clock control module 226 can include at least one of an instruction for checking the current communication frequency, an instruction for determining whether the checked communication frequency is the value in the range of the interference from the multiplication frequency of the memory clock frequency, an instruction for determining whether to change the memory clock frequency, an instruction for determining the change value of the memory clock frequency, and an instruction for changing the memory clock frequency. In this example the module is loaded into the processor of the controller to configure the controller to perform the aforementioned.

Herein, the instruction for checking the current communication frequency can include at least one of an instruction for checking the operation mode of the communication apparatus and an instruction for checking the communication channel being used. The instruction for determining whether the RF communication frequency is a value within the range of the interference can include an instruction for calculating the multiplication frequency value of the memory clock frequency and determining whether the difference between the communication frequency and the multiplication frequency is below the threshold. For example, the instruction for determining whether the communication frequency is the value in the range of the interference can include an instruction for determining whether the communication frequency is the value of the range corresponding to the memory clock frequency in one of the tables stored to the memory 220. For example, the instruction for determining whether the communication frequency is the value in the range of the interference can include an instruction for determining whether the communication frequency is not the value of the range corresponding to the memory clock frequency in one of the tables stored to the memory 220. The instruction for changing the memory clock frequency can include an instruction for determining the memory clock frequency value to change using the function which uses the communication frequency value and the memory clock frequency value as its input variables. For example, the instruction for changing the memory clock frequency can include an instruction for changing the memory clock frequency with the memory clock frequency value corresponding to the current communication frequency in one of the tables stored to the memory 220.

The controller 230 performs operation, control, and data processing for the operations of the communication apparatus. The controller 230 includes a processor 232, a memory controller 234, and a baseband processor 236. The processor 232 can be referred to as a Central Processing Unit (CPU). While a single processor 232 is depicted in FIG. 2, the processor 232 can be a set of chips. While the processor 232, the memory controller 234, and the baseband processor 236 are depicted as the separate blocks, they can be implemented using two or less chipsets.

The processor 232 runs the operating system 222 stored to the memory 220, and controls the communication apparatus. In other words, the processor 232 executes the software module(s) stored to the memory 220. Accordingly, while the memory controller 234 and the baseband processor 236 can be referred to as the processors, they are named as shown in FIG. 2 in order to clarify their functions.

The memory controller 234 controls the reading and writing of data to and from the memory 220. The memory controller 234 also can generate and provide the memory clock signal to the memory 220. For example, the memory controller 234 can generate the memory clock from a basic clock. The basic clock can be provided from a main chipset of the communication apparatus. The main chipset may comprise the processor 232, part of the processor 232, or a separate block not shown in FIG. 2. In particular, the memory controller 234 executes the memory clock control module 226 when same is stored to the memory 220. Alternatively, the memory clock control module 226 can be executed by the processor 232. In this case, the processor 232 adjusts the memory clock frequency under control of the memory controller 234.

The baseband processor 236 converts the baseband signal and a bit string according to a standard of the system. For example, to transmit the data, the baseband processor 236 generates complex symbols by encoding and modulating the transmit bit string. When receiving the data, the baseband processor 236 restores the receive bit string by demodulating and decoding the baseband signal fed from the communication unit 210. According to, for example, an Orthogonal Frequency Division Multiplexing (OFDM) scheme, the baseband processor 236 can further conduct an Inverse Fast Fourier Transform (IFFT) operation and an FFT operation.

Figure 3:
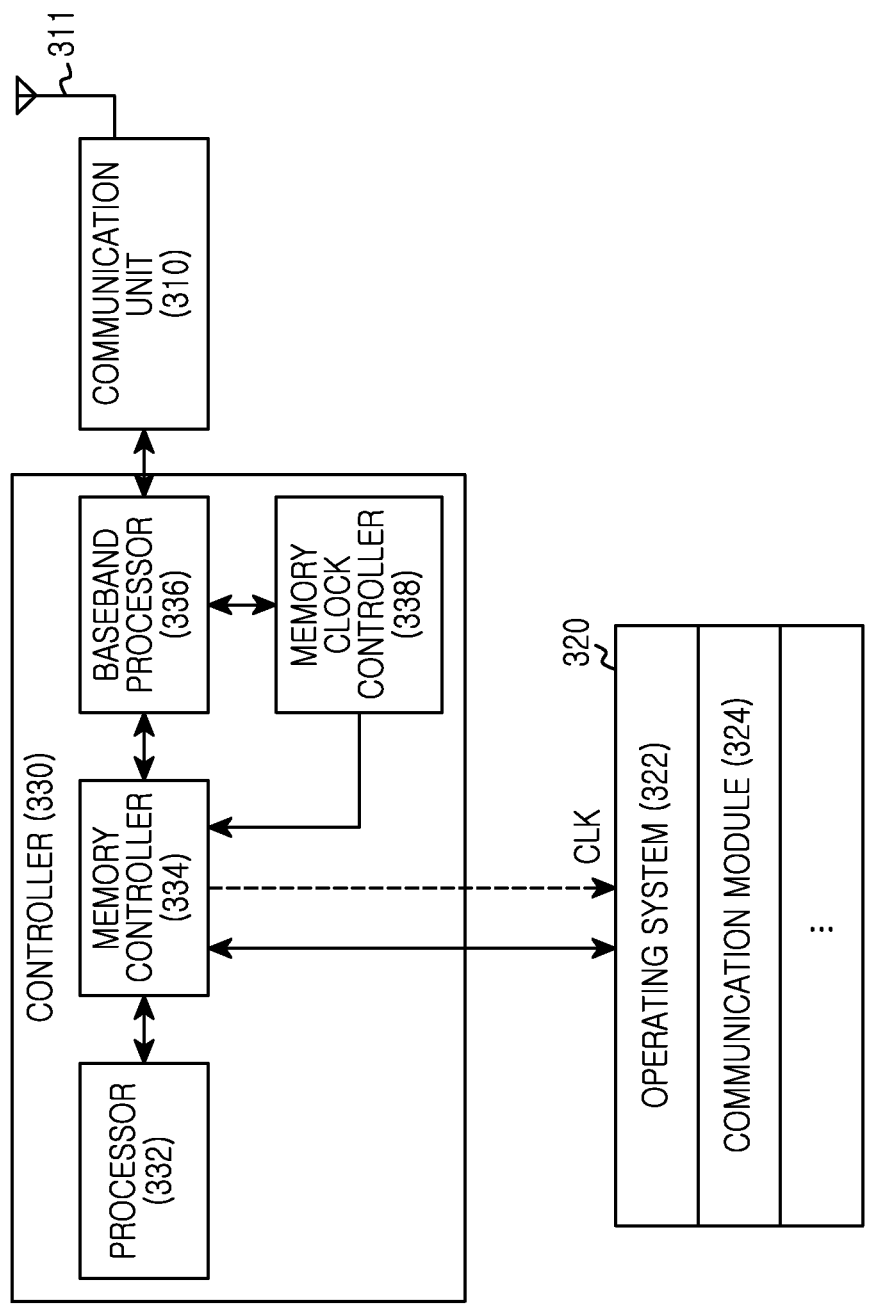
FIG. 3 is a block diagram of a communication apparatus in the wireless communication system according to another exemplary embodiment of the present invention.

FIG. 3 is a block diagram of a communication apparatus in the wireless communication system according to another exemplary embodiment of the present invention. In FIG. 3, the function for changing the memory clock frequency of the present invention is realized using a hardware module.

The communication unit 310 functions to transmit and receive signals over the radio channel. For example, the communication unit 310 includes an RF circuit. In other words, the communication unit 310 comprises a transceiver, and up-converts a baseband signal to an RF signal, transmits the RF signal via an antenna 311, and down-converts an RF signal received via the antenna 311 to a baseband signal. In detail, the communication unit 310 can include an amplifier, a mixer, an oscillator, a DAC, an ADC, and so on.

The memory 320 stores a program for operating the communication apparatus, and a software module comprising machine executable code on a machine readable medium. The memory 320 receives the memory clock signal from the controller 330. For example, the memory 320 can store machine executable code, and includes an operating system 322 and a communication module 324. Herein, the module stored on a machine readable medium (memory 320) can be referred to as the instruction set. The memory 320 can store at least one (1) a table arranging the interference relationship between the communication frequency and the memory clock frequency; (2) a table arranging a non-interference relationship between the communication frequency and the memory clock frequency; and (3) a table arranging the memory clock frequency values recommended for the available communication frequencies.

The controller 330 performs operation, control, and data processing for the operations of the communication apparatus. The controller 330 includes such hardware as a processor 332, a memory controller 334, a baseband processor 336, and a memory clock controller 338. The processor 332 can be referred to as the CPU. While a single processor 332 is depicted in FIG. 3, the processor 332 can be a set of chips. While the processor 332, the memory controller 334, the baseband processor 336, and the memory clock controller 338 are depicted as the separate blocks, they can be implemented using three or less chipsets.

The processor 332 runs the operating system 322 stored to the memory 320 (the operating system is loaded in the processor for operation), and controls the communication apparatus. In other words, the processor 332 can execute the machine executable code stored to the memory 320. Accordingly, while the memory controller 334, the baseband processor 336, and the memory clock controller 338 can be referred to as the processors, they are named as shown in FIG. 3 in order to clarify their functions.

The memory controller 334 controls the reading and writing of read and write data to and from the memory 320, which is a non-transitory storage medium. The memory controller 334 generates and provides the memory clock to the memory 320. For example, the memory controller 334 can generate the memory clock from the basic clock. The basic clock can be provided from the main chipset of the communication apparatus. The main chipset can comprise the processor 332, part of the processor 332, or a separate block not shown in FIG. 3.

With continued reference to FIG. 3, the baseband processor 336 converts the baseband signal and the bit string according to the standard of the system. For example, to transmit the data, the baseband processor 336 generates complex symbols by encoding and modulating the transmit bit string. When receiving the data, the baseband processor 336 restores the receive bit string by demodulating and decoding the baseband signal fed from the communication unit 310. According to the OFDM scheme, the baseband processor 336 can further conduct the IFFT operation and the FFT operation.

The memory clock controller 338 determines the frequency of the memory clock output from the memory controller 334. In this exemplary embodiment of the present invention, the memory clock controller 338 is the chipset designed to operate as shown in FIG. 1. More specifically, the memory clock controller 338 checks the current communication frequency and the current memory clock frequency, determines whether the checked communication frequency is the value in the range of the interference from the multiplication frequency of the memory clock frequency, determines whether to change the memory clock frequency, determines the change value of the memory clock frequency, and then requests the memory controller 334 to change the memory clock frequency. Alternatively, the memory clock controller 338 can be part of the processor 332 or the memory controller 334.

According to the present invention. by changing the frequency of the memory clock, since the multiplication frequency of the memory clock does not affect the frequency of the communication channel in the wireless communication system, the RF reception is enhanced.

The above-described methods according to the present invention can be implemented in hardware, firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein can be loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitutes hardware in the claimed invention. Under the broadest reasonable interpretation, the appended claims constitute statutory subject matter in compliance with 35 U.S.C. §101.

The terms "unit" or "module" as used herein is to be understood as constituting hardware such as a processor or microprocessor configured for a certain desired functionality in accordance with statutory subject matter under 35 U.S.C. §101, unless such module is disclosed as containing machine executable code that is loaded into another processor such as a processor of a controller, etc., and executed, and in no case does the claimed subject matter constitute software per se.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A communication apparatus in a wireless communication system, comprising:
    a controller comprising at least one processor; and
    a memory that operates at a memory clock frequency provided from the controller,
    wherein the controller is configured to check a communication frequency for transmission/reception, determine whether the communication frequency is a value within a range of interference from a multiplication frequency of the memory clock frequency, and change, when the communication frequency is the value the within the range of interference, a position of the memory clock frequency in a frequency domain, in which the range of interference comprises a sum of half of a communication bandwidth and a guard value.

2. The communication apparatus of claim 1, wherein the controller checks the communication frequency by checking relevant information comprising at least one of an operation mode and a communication channel being used by the communication apparatus.

3. The communication apparatus of claim 1, wherein the controller determines whether the communication frequency is the value within the range of the interference, the controller calculates a multiplication frequency value of the memory clock frequency and determines whether a difference between the communication frequency and the multiplication frequency is below a predetermined threshold.

4. The communication apparatus of claim 1, wherein the memory stores a table which contains values that arranges an interference relationship between the communication frequency and the memory clock frequency, and
    to determine whether the communication frequency is the value in the range of the interference, the controller determines whether the communication frequency is a value within a range corresponding to the memory clock frequency in the table.

5. The communication apparatus of claim 1, wherein the memory stores a table which contain values that arrange a non-interference relationship between the communication frequency and the memory clock frequency, and
    wherein the controller determines whether the communication frequency is not a value of a range corresponding to the memory clock frequency in the table to determine whether the communication frequency is the value within the range of the interference.

6. The communication apparatus of claim 1, wherein the controller determines a change of a memory clock frequency value by using a function which includes a communication frequency value and the memory clock frequency value as input variables.

7. The communication apparatus of claim 1, wherein the memory stores a table which defines memory clock frequency values recommended for available communication frequencies, and
    the controller changes the memory clock frequency with a memory clock frequency value corresponding to a current communication frequency in the table.

8. An operating method of a communication apparatus in a wireless communication system, comprising:
    checking by a controller a communication frequency of data being received via a wireless transmission;
    determining whether the communication frequency is a value within a range of interference from a multiplication frequency of a memory clock frequency; and
    changing when the communication frequency is the value the within the range of interference, a position of the memory clock frequency in a frequency domain, in which the range of interference comprises a sum of half of a communication bandwidth and a guard value.

9. The operating method of claim 8, wherein the checking of the communication frequency comprises:
    checking relevant information comprising at least one of an operational mode and a communication channel of a communication method in which data is transmitted.

10. The operating method of claim 8, wherein the determining of whether the communication frequency is within the value in the range of the interference comprises:
    calculating by the controller a multiplication frequency value of the memory clock frequency and determining whether a difference between the communication frequency and the multiplication frequency is below a threshold.

11. The operating method of claim 8, wherein the communication apparatus stores a table having multiplication values which correspond to an interference relationship between the communication frequency and the memory clock frequency, and
    determining whether the communication frequency is a value within the range of the interference comprises:
    determining whether the communication frequency is a value within a range corresponding to the memory clock frequency in the table.

12. The operating method of claim 8, wherein the communication apparatus stores a table having multiplication values which correspond to a non-interference relationship between the communication frequency and the memory clock frequency, and
    determining whether the communication frequency is within the value in the range of the interference comprises:
    determining whether the communication frequency is not a value within a range corresponding to the memory clock frequency in the table.

13. The operating method of claim 8, wherein the changing of the memory clock frequency comprises:
    determining a memory clock frequency value to change utilizing a function which includes a communication frequency value and the memory clock frequency value as input variables.

14. The operating method of claim 8, wherein the memory stores a table which comprises memory clock frequency values recommended for available communication frequencies, and the changing of the memory clock frequency comprises:
changing the memory clock frequency with a memory clock frequency value corresponding to a current communication frequency in the table.

15. A communication apparatus in a wireless communication system, comprising:
a controller comprising at least one processor;
a memory that operates at a memory clock frequency provided from the at least one processor; and
at least one module stored to the memory to be executed by the at least one processor,
wherein the at least one module comprises instructions executed by the processor that check a communication frequency, determine whether the communication frequency is a value in a range of interference from a multiplication frequency of the memory clock frequency, and change, when the communication frequency is the value the within the range of interference, a position of the memory clock frequency in a frequency domain, in which the range of interference comprises a sum of half of a communication bandwidth and a guard value.

16. The communication apparatus of claim 15, wherein checking the communication frequency comprises at least one of checking a relevant information comprising an operation mode of the communication apparatus and checking a communication channel being used.

17. The communication apparatus of claim 15, wherein determining whether the communication frequency is the value in the range of the interference includes the controller calculating a multiplication frequency value of the memory clock frequency and determining whether a difference between the communication frequency and the multiplication frequency is below a threshold.

18. The communication apparatus of claim 15, wherein the memory stores a table having multiplication values which correspond to an interference relationship between the communication frequency and the memory clock frequency, and the instruction for determining whether the communication frequency is the value within the range of the interference comprises the controller being configured for determining whether the communication frequency comprises a value of a range corresponding to the memory clock frequency in the table.

19. The communication apparatus of claim 15, wherein the memory stores a table having multiplication values which correspond to a non-interference relationship between the communication frequency and the memory clock frequency, and the controller being configured for determining whether the communication frequency is the value within the range of the interference comprises the controller being configured for determining whether the communication frequency is not a value of a range corresponding to the memory clock frequency in the table.

20. The communication apparatus of claim 15, wherein changing the memory clock frequency comprises the controller being configured for determining a memory clock frequency value to change using a function which uses a communication frequency value and the memory clock frequency value as input variables.

21. The communication apparatus of claim 15, wherein the memory stores a table which defines memory clock frequency values recommended for available communication frequencies, and the controller being configured for changing the memory clock frequency includes changing the memory clock frequency with a memory clock frequency value corresponding to a current communication frequency in the table.

* * * * *